US011099753B2

(12) United States Patent
Shveidel

(10) Patent No.: US 11,099,753 B2
(45) Date of Patent: Aug. 24, 2021

(54) METHOD AND APPARATUS FOR DYNAMIC FLOW CONTROL IN DISTRIBUTED STORAGE SYSTEMS

(71) Applicant: EMC IP Holding Company LLC, Hopkinton, MA (US)

(72) Inventor: Vladimir Shveidel, Pardes-Hana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 247 days.

(21) Appl. No.: 16/047,087

(22) Filed: Jul. 27, 2018

(65) Prior Publication Data

US 2020/0034058 A1     Jan. 30, 2020

(51) Int. Cl.
| | | |
|---|---|---|
| *G06F 3/06* | (2006.01) | |
| *H04L 12/24* | (2006.01) | |
| *H04L 29/08* | (2006.01) | |
| *G06F 15/173* | (2006.01) | |
| *G06F 15/16* | (2006.01) | |
| *H04B 1/06* | (2006.01) | |

(52) U.S. Cl.
CPC ............ *G06F 3/0632* (2013.01); *G06F 3/067* (2013.01); *G06F 3/0611* (2013.01); *H04L 41/0816* (2013.01); *H04L 67/1097* (2013.01); *H04B 1/06* (2013.01)

(58) Field of Classification Search
CPC ...... G06F 3/0632; G06F 3/0611; G06F 3/067; H04L 41/0816; H04L 67/1097; H04L 43/0852; H04B 1/06
USPC ......................................................... 709/234
See application file for complete search history.

(56) References Cited

U.S. PATENT DOCUMENTS

| | | | | |
|---|---|---|---|---|
| 8,010,753 | B2 * | 8/2011 | Zohar | G06F 3/0631 |
| | | | | 711/153 |
| 9,633,066 | B1 * | 4/2017 | Rajaa | G06F 16/2365 |
| 9,665,405 | B1 * | 5/2017 | Goodnight | G06Q 10/0635 |
| 10,503,693 | B1 * | 12/2019 | Joshi | G06F 16/137 |
| 1,055,258 | A1 * | 2/2020 | Jadon | G06F 3/0655 |
| 10,552,058 | B1 * | 2/2020 | Jadon | G06F 3/0655 |
| 10,585,927 | B1 * | 3/2020 | Liao | G06F 16/3349 |
| 2006/0120609 | A1 * | 6/2006 | Ivanov | G06K 9/6293 |
| | | | | 382/224 |
| 2009/0228294 | A1 * | 9/2009 | Choi | G06Q 90/00 |
| | | | | 705/317 |
| 2010/0037200 | A1 * | 2/2010 | Ghan | G03F 7/70466 |
| | | | | 716/55 |
| 2010/0174813 | A1 * | 7/2010 | Hildreth | H04L 51/34 |
| | | | | 709/224 |
| 2010/0306278 | A1 * | 12/2010 | Oliver | G06F 16/9024 |
| | | | | 707/803 |

(Continued)

*Primary Examiner* — David R Lazaro
*Assistant Examiner* — Berhanu Shitayewoldetadik
(74) *Attorney, Agent, or Firm* — Daly, Crowley Mofford & Durkee, LLP

(57) ABSTRACT

A method for processing I/O requests that are received at a distributed storage system including a plurality of receiver nodes, a plurality of first nodes, and a plurality of second nodes, the method comprising: receiving, at a receiver node, an I/O request and executing the I/O request by using at least one of the first nodes and at least one of the second nodes; receiving, by the receiver node, one or more latency metrics from each of the first nodes and second nodes that are used to execute the I/O request, and reconfiguring the storage system, by the receiver node, based on any of the received latency metrics.

15 Claims, 13 Drawing Sheets

(56) References Cited

U.S. PATENT DOCUMENTS

| | | | |
|---|---|---|---|
| 2011/0013516 A1* | 1/2011 | Black | H04L 69/16 370/236 |
| 2014/0074834 A1* | 3/2014 | Pike | G06F 16/1827 707/736 |
| 2014/0164581 A1* | 6/2014 | Park | G06F 11/3433 709/221 |
| 2014/0215044 A1* | 7/2014 | Gulati | H04L 49/90 709/223 |
| 2016/0233979 A1* | 8/2016 | Koike-Akino | H03M 13/1102 |
| 2017/0156161 A1* | 6/2017 | Kang | H04W 74/0816 |
| 2017/0212837 A1* | 7/2017 | Breternitz | G06F 3/0611 |
| 2017/0223097 A1* | 8/2017 | Zhang | H04L 67/1097 |
| 2017/0371558 A1* | 12/2017 | George | G06F 3/0631 |
| 2018/0109584 A1* | 4/2018 | Koster | H04L 43/0852 |
| 2018/0181559 A1* | 6/2018 | Matskevich | G06F 40/211 |
| 2018/0198698 A1* | 7/2018 | Rife | H04L 12/2809 |
| 2018/0232563 A1* | 8/2018 | Albadawi | G06K 9/00362 |
| 2018/0260125 A1* | 9/2018 | Botes | G06F 3/067 |
| 2018/0375927 A1* | 12/2018 | Nozawa | H04L 67/1097 |
| 2019/0196908 A1* | 6/2019 | Chiba | G06F 3/06 |
| 2019/0373521 A1* | 12/2019 | Crawford | H04L 67/146 |
| 2020/0097505 A1* | 3/2020 | Ishida | G16Y 30/00 |
| 2020/0175334 A1* | 6/2020 | Zhang | G06K 9/6262 |
| 2020/0201875 A1* | 6/2020 | Wu | G06F 16/254 |
| 2020/0233974 A1* | 7/2020 | Miron | H04L 51/12 |
| 2020/0250527 A1* | 8/2020 | Zhao | G06N 3/0472 |
| 2021/0020191 A1* | 1/2021 | Venneti | G06N 20/00 |

* cited by examiner

METHOD AND APPARATUS FOR DYNAMIC FLOW CONTROL IN DISTRIBUTED STORAGE SYSTEMS

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified than that are further described below in the Detailed Description. This Summary is not intended to identify key features or essential features of the claimed subject matter, nor is it intended to be used to limit the scope of the claimed subject matter.

According to aspects of the disclosure, a method for processing I/O requests that are received at a distributed storage system including a plurality of receiver nodes, a plurality of first nodes, and a plurality of second nodes, the method comprising: receiving, at a receiver node, an I/O request and executing the I/O request by decomposing the I/O request into a plurality of first internal commands and providing each of the first internal commands to one of a plurality of first nodes, each of the plurality of first nodes being configured to decompose any received first internal commands into one or more second internal commands and provide each of the second internal commands to one of a plurality of second nodes; receiving, at the receiver node, one or more first latency metrics, each of the first latency metrics being generated by a respective one of the plurality of first nodes and indicating, at least partially, a time taken by the respective first node to execute a respective first internal command that is provided to the respective first node by the receiver node; receiving, at the receiver node, one or more second latency metrics, each of the second latency metrics being generated by a respective one of the plurality of second nodes and indicating, at least partially, a time taken by the respective second node to execute a respective second internal command that is provided to the respective second node by one of the plurality of first nodes; and reconfiguring the storage system based on any of the first latency metrics and the second latency metrics.

According to aspects of the disclosure, an apparatus for use in a distributed storage system, comprising: a memory, and one or more processors operatively coupled to the memory, the one or more processors being configured to perform a method comprising the steps of: receiving an I/O request and executing the I/O request by decomposing the I/O request into a plurality of first internal commands and providing each of the first internal commands to one of a plurality of first nodes, each of the plurality of first nodes being configured to decompose any received first internal commands into one or more second internal commands and provide each of the second internal commands to one of a plurality of second nodes; receiving one or more first latency metrics, each of the first latency metrics being generated by a respective one of the plurality of first nodes and indicating, at least partially, a time taken by the respective first node to execute a respective first internal command that is provided to the respective first node by the one or more processors; receiving one or more second latency metrics, each of the second latency metrics being generated by a respective one of the plurality of second nodes and indicating, at least partially, a time taken by the respective second node to execute a respective second internal command that is provided to the respective second node by one of the plurality of first nodes; and reconfiguring the storage system based on any of the first latency metrics and the second latency metrics.

According to aspects of the disclosure, a non-transitory computer-readable medium configured to store one or more processor-executable instructions, which when executed by at least one processor causes the at least one processor to perform a method comprising the steps of: receiving, at a receiver node in a distributed storage system, an I/O request and executing the I/O request by decomposing the I/O request into a plurality of first internal commands and providing each of the first internal commands to one of a plurality of first nodes, each of the plurality of first nodes being configured to decompose any received first internal commands into one or more second internal commands and provide each of the second internal commands to one of a plurality of second nodes; receiving, at the receiver node, one or more first latency metrics, each of the first latency metrics being generated by a respective one of the plurality of first nodes and indicating, at least partially, a time taken by the respective first node to execute a respective first internal command that is provided to the respective first node by the receiver node; receiving, at the receiver node, one or more second latency metrics, each of the second latency metrics being generated by a respective one of the plurality of second nodes and indicating, at least partially, a time taken by the respective second node to execute a respective second internal command that is provided to the respective second node by one of the plurality of first nodes; and reconfiguring the storage system based on any of the first latency metrics and the second latency metrics.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

According to aspects of the disclosure, a distributed storage system is disclosed in which nodes are organized in tiers. In that storage system, incoming I/O requests are received at nodes in a top tier of the storage system and subsequently decomposed into internal commands that are executed by nodes in the lower tiers of the storage system. At least some of the internal commands may be executed in parallel with one another, which in turn may result in an increase of the speed at which incoming I/O requests are fulfilled by the distributed storage system.

According to aspects of the disclosure, a technique for performing flow control in the distributed storage system is disclosed. According to the technique, each node in the top tier of the distributed storage system may he provided with a bandwidth limiter that limits the maximum number of incoming I/O requests which the node is configured to accept and/or process concurrently. The maximum number of incoming I/O request may be based on a window size of the bandwidth limiter. The window size of the bandwidth limiter may be adjusted dynamically based on latency metrics provided by nodes in the lower tiers of the storage system. Examples of different processes for adjusting the window sizes of nodes in the top tier are provided further below with respect to FIGS. 1-14.

Figure 1:
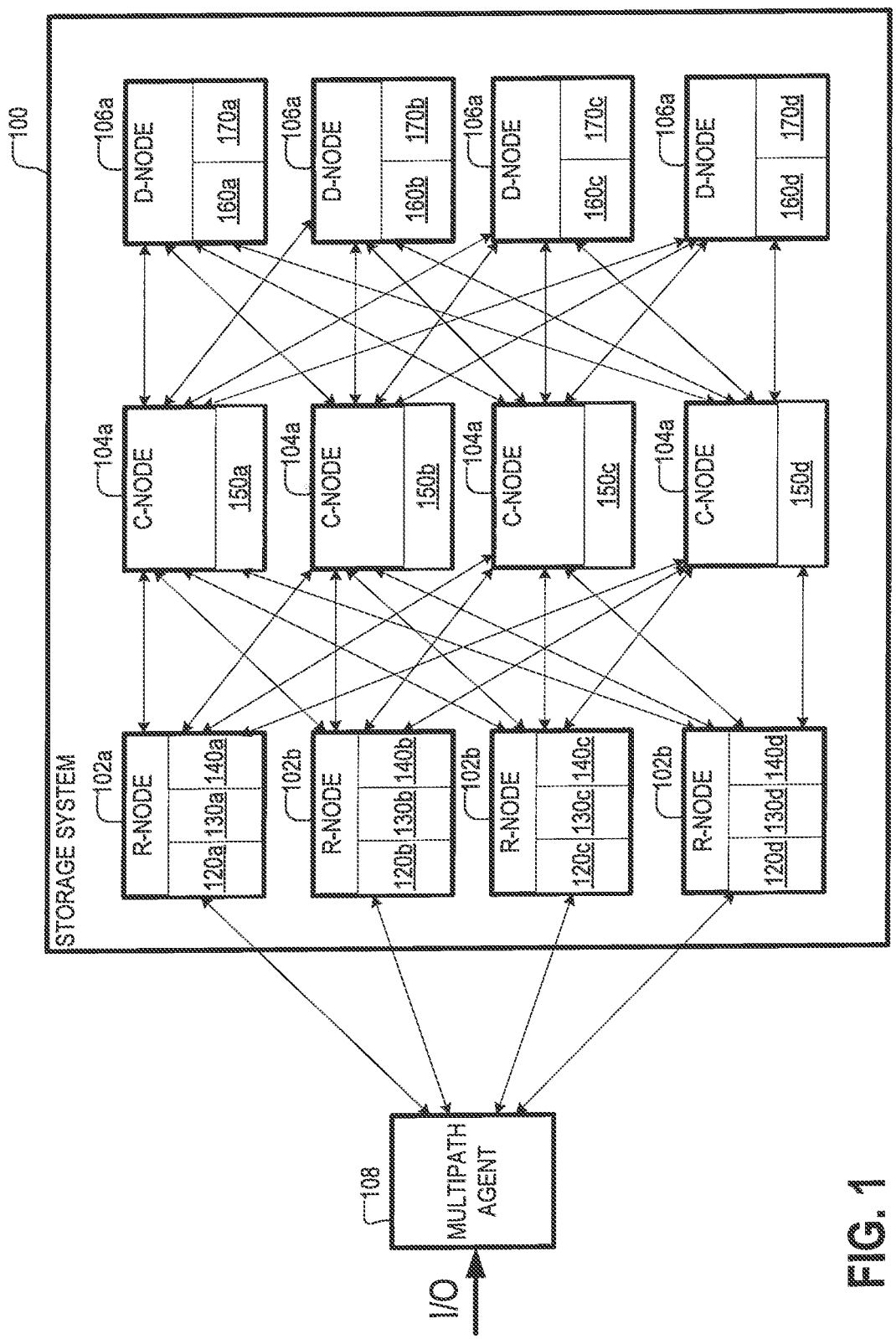
FIG. 1 is a diagram of an example of a distributed storage system including a plurality of R-nodes, a plurality of C-nodes, and a plurality of D-nodes, according to aspects of the disclosure.

FIG. 1 is a diagram of an example of a storage system 100, according to aspects of the disclosure. As illustrated, the storage system 100 may include a plurality of R-nodes 102, a plurality of C-nodes 104, and a plurality of D-nodes 106 that are connected to one via a communications network. In some implementations, the R-nodes 102, the C-nodes 104, and the D-nodes 106 may be connected to one another via an InfiniBand (IS) via InfiniBand (TB) links, Fibre Channel (FC) links, and/or any other suitable type of link. In some implementations, the R-nodes 102, the C-nodes 104, and the D-nodes 106 may be communicatively coupled to one another using any suitable topology that allows data to travel from each of the R-nodes 102 to any of the D-nodes 106 via any of the C-nodes 104.

The R-nodes 102 may be configured to terminate storage area network (SAN) Read/Write commands, received at the storage system 100 from a multipath agent 108, and route them to appropriate C-nodes 104 and D-nodes 106 for further execution. In doing so, the R-nodes 102 may distribute a workload over multiple C-nodes 104 and D-nodes 106, In some implementations, any of the R-nodes 102 may be configured to write I/O requests (e.g., SCSI I/O requests) to selected ones of the C-nodes 104 for further processing.

In some implementations, each of the R-nodes 102 may be provided with a respective address-to-control-module (A2C) table 120 that identifies a plurality of C-nodes (e.g., the C-nodes 104) and a different respective LDA range that is managed by each of the C-nodes. In this regard, the A2C table 120 may define a plurality of logical spaces that are managed by different C-nodes 104, In the present example, a copy of the A2C table 120 is stored on each of the R-nodes 102. However, it will be understood that the present disclosure is not limited to any specific method for allocating respective logical spaces to the C-nodes 104.

In some implementations, each of the R-nodes 102 may be provided with a respective bandwidth limiter 130 that is configured to prevent concurrent I/O requests for the R-node from exceeding a window size 140 corresponding to that bandwidth limiter 130. In some implementations, the window size 140 of any of the R-nodes 102 may be a variable (e.g., a number, string, or alphanumerical string), which is stored in a memory of the R-node 102 (or elsewhere), and which specifies the maximum number of concurrent I/O request which the R-node 102 is configured to accept and/or process concurrently at a given time (e.g., by using the R-node's 102 respective bandwidth limiter 130). According to aspects of the disclosure, I/O requests in excess of the window size for a given R-node 102 may be either rejected or queued by the R-node's bandwidth limiter 130 until use of the R-node 102 is below the window size. To reduce sensitivity to traffic bursts, described examples of the bandwidth limiters 130 may employ delayed rejection of excessive I/O requests. For example, any given bandwidth limiter 130 may queue a subsequent I/O request, and only reject a queued I/O request after a retention interval expires. For example, if a traffic burst causes numerous I/O requests in excess of the window size, queued I/O requests may be able to be processed as the traffic burst subsides, and before the retention interval expires. However, in a system that is not experiencing bursty traffic, but instead is experiencing persistent overloading, queued I/O requests may be rejected as a retention interval expires for a given queued I/O request.

In some implementations, the bandwidth limiter 130$a$ may prevent concurrent I/O requests for the R-node 102$a$ from exceeding the window size 140$a$; the bandwidth limiter 130$b$ may prevent concurrent I/O requests for the R-node 102$b$ from exceeding the window size 140$b$; the bandwidth limiter 130$c$ may prevent concurrent I/O requests for the R-node 102$c$ from exceeding the window size 140$c$; and the bandwidth limiter 130$d$ may prevent concurrent I/O requests for the R-node 102$d$ from exceeding the window size 140$d$. In some implementations, the window sizes 140$a$-$d$ may be all the same. Alternatively, in some implementations, at least two of the window sizes 140$a$-$d$ may be different from one another. As is discussed further below, each of the R-nodes 102 may adjust its respective window size, independently of the remaining R-nodes 102, based on latency metrics received at this R-node, This, in turn, may result in different R-nodes 102 having different respective window sizes.

The C-nodes 104 may be configured to control the execution of C-node commands supplied by the R-nodes 102. The C-node commands may be used to implement read requests, write requests, and/or any other suitable I/O request. In addition, each of the C-nodes 104 may maintain and manage key metadata elements. Each of the C-nodes 104 may be configured to receive C-node commands from the R-nodes and communicate with the D-nodes 106 to execute the commands. In some implementations, each C-node 104 may maintain a hash-to-D-node (H2D) table 150 that identifies a plurality of D-nodes and a different respective hash digest range that is associated with each of the D-nodes. In this regard, the H2D table may effectively define a plurality of logical spaces that are managed by different D-nodes 106. In the present example, a copy of the H2D table is stored on each of the C-nodes 104. However, the present disclosure is not limited to any specific method for allocating respective logical spaces to the D-nodes 106.

The D-nodes 106 may be configured to control the execution of D-node commands supplied by the C-nodes 104. Each of the D-nodes 106 may be attached to one or more volumes 160. Each volume 160 may include a physical volume, such as a solid-state drive (SSD), a spinning hard drive (HD), and/or any other suitable type of non-volatile and/or volatile storage device. Each of the D-nodes may store in memory a hash-to-physical-address (H2P) table 170. The H2P table 170 may identify a plurality of physical addresses in the volumes 160, and different respective hash digest that is mapped to each of the physical addresses. In this regard, the H2P table 170 may be used to map hash digests received from the C-nodes to different physical locations in the volumes 160 managed by the D-nodes 106, In the present example, each of the D-nodes 106 includes a different table H2P table 170 that is specific to that D-node. However, the disclosure is not limited to any specific method for performing hash-to-physical address mapping. Although FIG. 1 depicts the volumes 160 as being integrated into the D-nodes 106, it will be understood that the present disclosure is not limited to any specific method for attaching the volumes 160 to the D-nodes 106.

In operation, any of the R-nodes 102 may receive an I/O request that spans a range of logical data addresses (LDAs) from the multipath agent 108. The request may include a block of data and an opcode identifying an action that is required to be performed. In response to the request, the R-node 102 may use its respective A2C table to identify a plurality of C-nodes 104 based on the A2C table. Afterwards, the R-node 102 may decompose the I/O request into a plurality of C-node commands and forward the C-node commands to the identified C-nodes 104 for further processing.

In operation, any of the C-nodes 104 may receive a C-node command that is generated by one of the R-nodes 102. The C-node command may include a data payload and an opcode identifying an action that is required to be performed. Upon receiving the C-node command, the C-node 104 may decompose the C-node command into a plurality of D-node commands and forward each of the D-node commands. In some implementations, each of the D-node commands may include a different page of data along with a hash digest of the page. Each D-node command may then be forwarded to a respective D-node 106 that is selected based on the H2D table 150 and the D-node command's hash digest (i.e., the D-node responsible for managing the range of hash digests which the D-node command's respective hash digest falls into).

In operation, any of the D-nodes 106 may receive a D-node command that is generated by one of the C-nodes 104. Next, the D-node 106 may search its respective H2P table to identify a physical address in one of its associated volumes 160 that corresponds to the hash digest that is contained in the D-node command. Afterwards, the D-node 106 may store the payload of the D-node command (i.e., the page of data contained in the D-node command) at the identified physical address.

Figure 2:
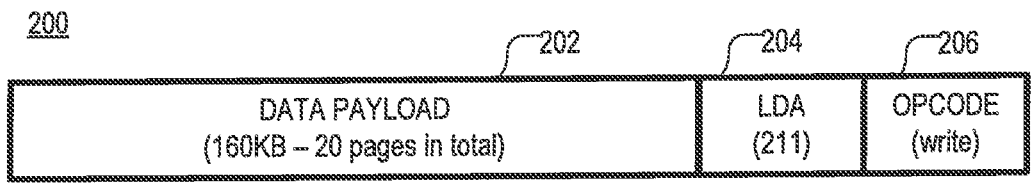
FIG. 2 is a diagram of an example of an I/O request, according to aspects of the disclosure.
Figure 3:
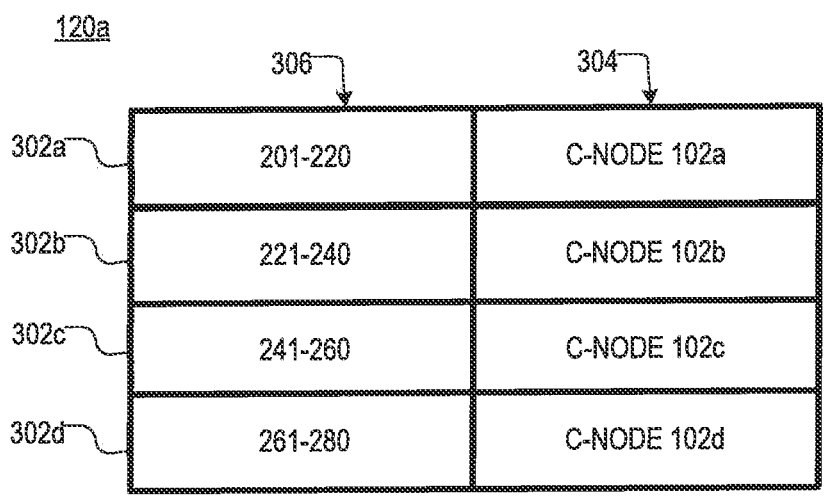
FIG. 3 is a diagram of an example of an A2C table, according to aspects of the disclosure.

Shown in FIG. 2 is an example of an I/O request 200 that is received at the R-node 102*a*, according to aspects of the disclosure. The I/O request 200 may include a data payload 202, an address field 204, and an opcode 206 requesting the storage of the data payload 202 at the LDA specified by the address field 204. Shown in FIG. 3 is an example of the A2C table 120*a*, according to aspects of the disclosure. As illustrated, the table 120*a* includes a plurality of rows 302. Each row 302 includes a different C-node identifier 304, and an indication of an LDA range 306 that is managed by that C-node 104. According to the present example, row 302*a* indicates that C-node 104*a* is responsible for handling I/O operations for a first LDA range spanning LDAs 201-220; row 302*b* indicates that C-node 104*b* is responsible for handling I/O operations for a second LDA range spanning LDAs 221-240; row 302*c* indicates that C-node 104*c* is responsible for handling I/O operations for a second LDA range spanning LDAs 241-260; and row 302*d* indicates that C-node 104*d* is responsible for handling I/O operations for a second LDA range spanning LDAs 261-280.

The respective LDA range assigned to each C-node 104 may be referred to as the "logical space" that is managed by this C-node 104. In the present example, each C-node is configured to perform operations in that C-node's respective logical space only. However, in the present example, the I/O request 200 effectively requires a first portion of the data payload 202 to be stored in the logical space of the C-node 104*a* and a second portion of the data payload 202 to be stored in the logical space of the C-node 104*b*. For this reason, to execute the I/O request 200, the R-node 102 is configured to decompose the I/O request 200 into C-node commands 410*a* and 410*b* (shown in FIG. 4).

Figure 4:
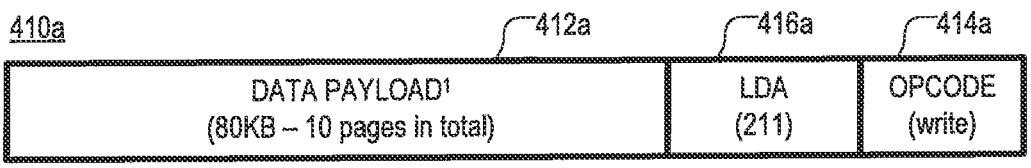
FIG. 4 is a diagram of an example of a plurality of C-node commands that are generated based on the I/O request of FIG. 1, according to aspects of the disclosure.
Figure 4:
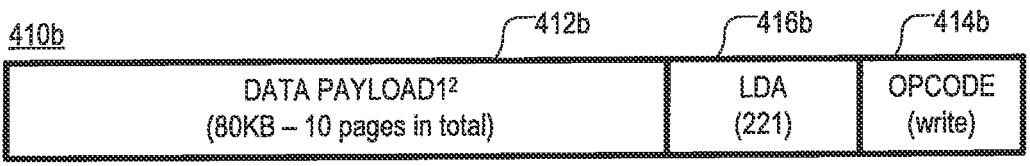

As illustrated in FIG. 4, the C-node command 410*a* is intended for execution by the C-node 104*a*, and it instructs the C-node 104*a* to store the data payload 412*a* at the location designated by the address field 416*a*. The address field 416*a* specifies an address within the logical space managed by the C-node 104*a* and the opcode 414*a* specifies the operation that is to be performed e., a write operation) at the specified address. In this regard, the data payload 412*a* of the C-node command 410*a* may he the first portion of the data payload 202 that is required (by the I/O request 200) to he stored within the logical space of the C-node 104*a*.

As illustrated in FIG. 4, the C-node command 410*b* is intended for execution by the C-node 104*b*, and it instructs the C-node 104*b* to store the data payload 412*b* at the location designated by the address field 416*b*. The address field 416*b* specifies an address within the logical space managed by the C-node 104*b* and the opcode 414*a* specifies the operation that is to be performed (i.e., a write operation) at the specified address. In this regard, the data payload 412*b* of the C-node command 410*b* may be the second portion of the data payload 202 that is required (by the I/O request 200) to be stored within the logical space of the C-node 104*b*.

Figure 5:
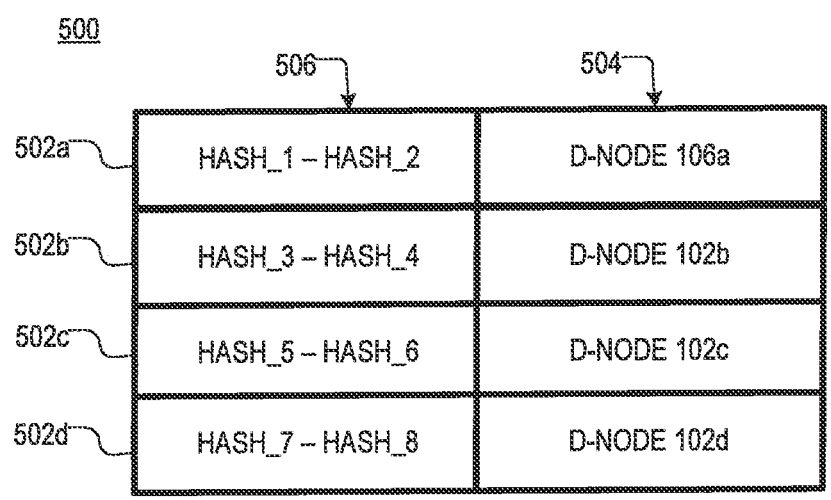
FIG. 5 is a diagram of an example of an H2D table, according to aspects of the disclosure.

Shown in FIG. 5 is an example of an H2D table 500, according to aspects of the disclosure. In the present example, the H2D table is the same as the H2D tables 150a and 150b. As illustrated, the table 500 includes a plurality of rows 502. Each row 502 includes an indication of a different hash digest range 506 and a respective identifier 504 for one of the D-nodes 106 that is responsible for executing D-node requests designating hash digests that fall within the hash digest range. According to the present disclosure, the respective hash digest range assigned to each D-node 106 by the H2D table 500 may be referred to as the "logical space" that is managed by this D-node 106. In the present example, each D-node is configured to perform operations in that D-node's respective logical space only.

Figure 6:
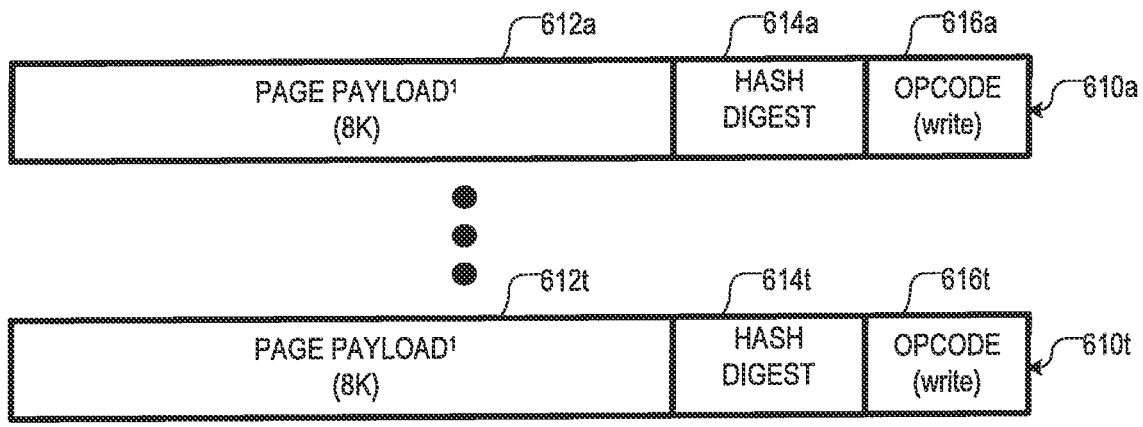
FIG. 6 is a diagram of an example of a plurality of D-node commands that area generated based on one of the C-node commands of FIG. 4, according to aspects of the disclosure.

Shown in FIG. 6 is an example of a plurality of D-node commands 610 generated by the C-node 104a by decomposing the C-node command 410a. In the present example, the C-node command 410a includes 10 pages of data, and for this reason, the C-node command 410a is decomposed into ten different D-node commands 610. Each D-node command 610 may include a data payload 612, a hash digest 614 of the data payload 612, and an opcode 616 requesting the storage of the data payload 612 at a location that is identified by the hash digest 614. Each data payload 612 may correspond to a different page of the data payload 412a of the C-node command 410a. In the present example, the hash digests of the D-node commands 610a-e fall within the logical space of the D-node 106a, and for this reason, they are forwarded by the C-node 104a to the D-node 106a. Furthermore, in the present example, the hash digests of the D-node commands 610f-j fall within the logical space of the D-node 106b, and for this reason, they are forwarded by the C-node 104a to the D-node 106b.

Figure 7:
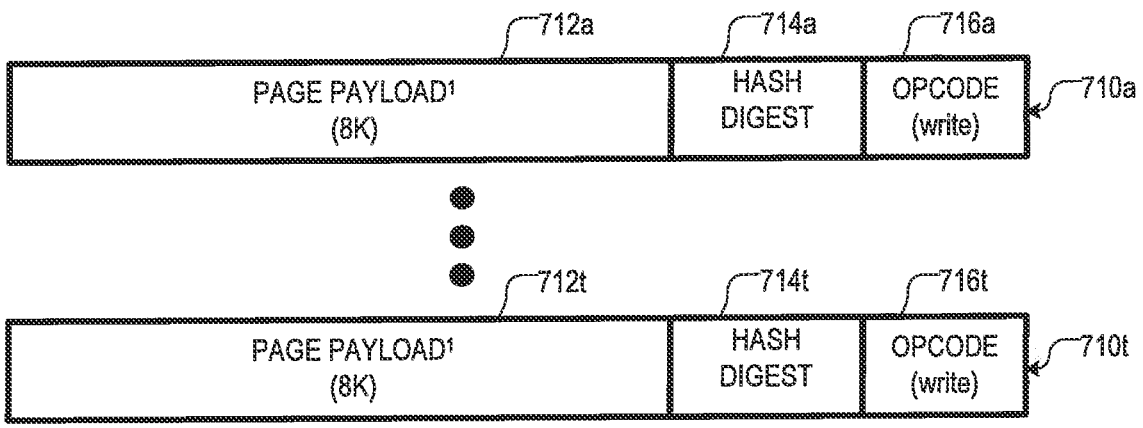
FIG. 7 is a diagram of an example of a plurality of D-node commands that are generated based on another one of the C-node commands of FIG. 4, according to aspects of the disclosure.

Shown in FIG. 7 is an example of a plurality of D-node commands 710 generated by the C-node 104b by decomposing the C-node command 410b. In the present example, the C-node command 410b includes 10 pages of data, and for this reason, the C-node command 410b is decomposed into ten different D-node commands 710. Each D-node command 710 may include a data payload 712, a hash digest 714 of the data payload 712, and an opcode 716 requesting the storage of the data payload 712 at a location that is identified by the hash digest 714. Each data payload 712 may correspond to a different page of the data payload 412b of the C-node command 410b. In the present example, the hash digests of the D-node commands 710a-e fall within the logical space of the D-node 106c, and for this reason, they are forwarded by the C-node 104b to the D-node 106c, Furthermore, in the present example, the hash digests of the D-node commands 710f-j fall within the logical space of the D-node 106d, and for this reason, they are forwarded by the C-node 104b to the D-node 106d.

Figure 8A:
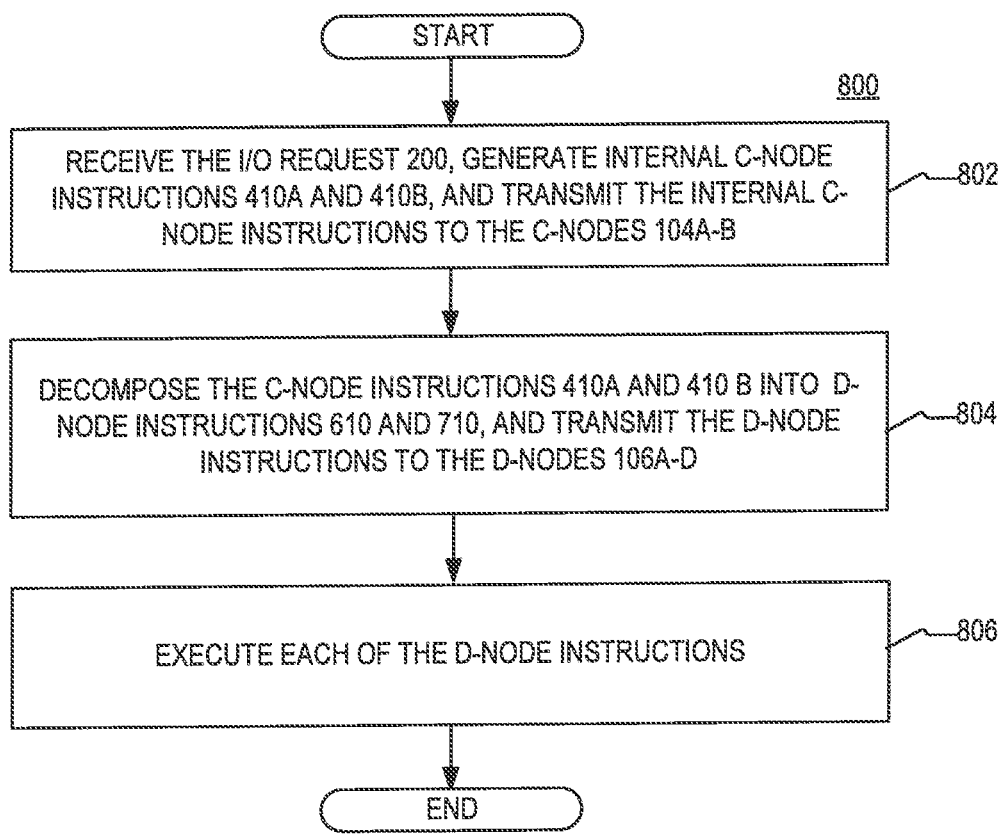
FIG. 8A is a flowchart of an example of a process for executing the I/O request of FIG. 2, according to aspects of the disclosure.
Figure 8B:
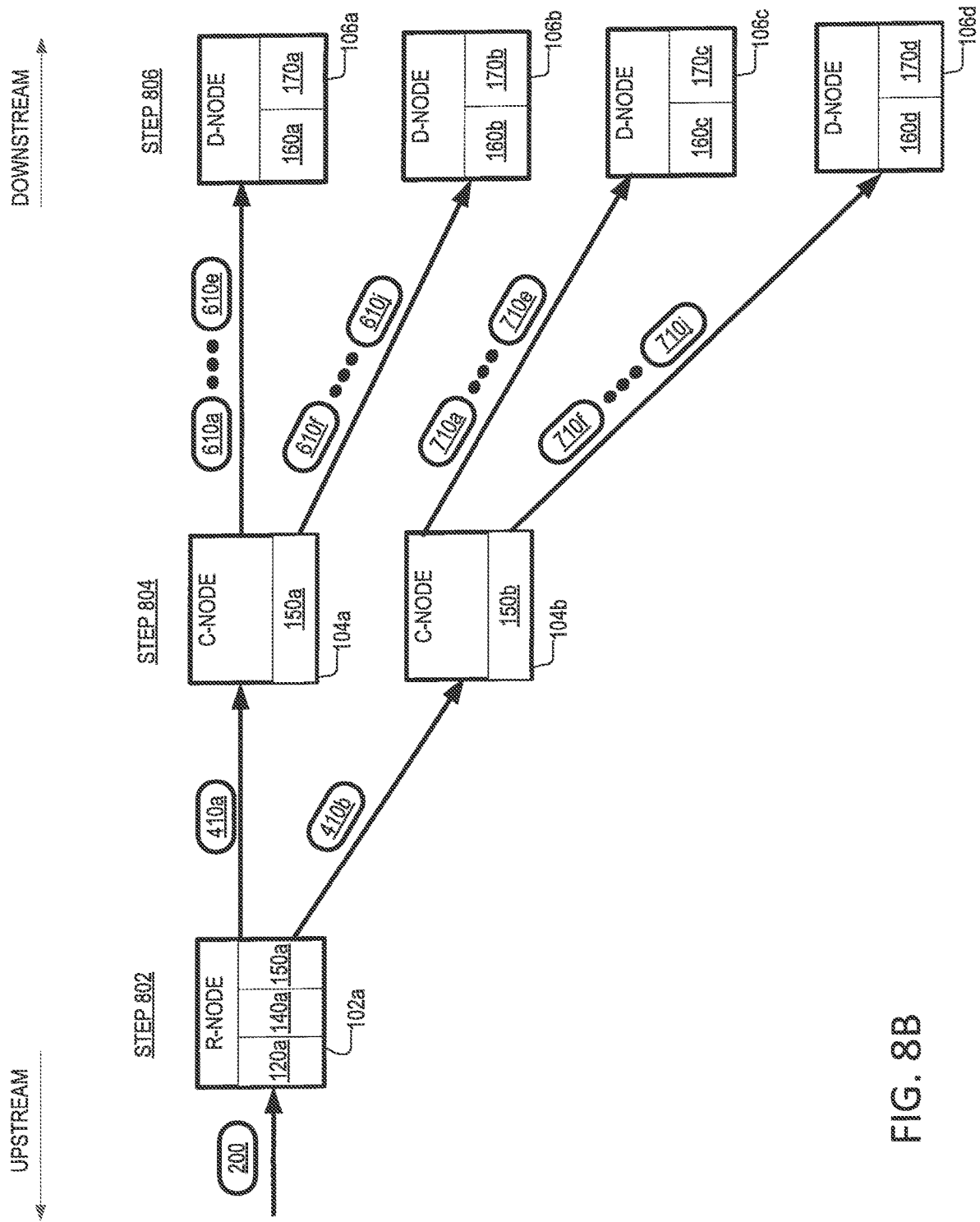
FIG. 8B is a diagram illustrating the execution of the process of FIG. 8A, according to aspects of the disclosure.

FIGS. 8A-B show a process 800 for executing the I/O request 200 by the storage system 100, according o aspects of the disclosure.

At step 802, the I/O request 200 is received at the R-node 102 and decomposed into C-node commands 410a and 410b. After the C-node commands 410a and 410b are generated, the C-node command 410a is transmitted from the R-node 102a to the C-node 104a and the C-node command 410b is transmitted from the R-node 102a to the C-node 104b for further processing.

At step 804, the C-node 104a receives the C-node command 410a, and decomposes the C-node command 410a into the plurality of D-node commands 610a-j. The C-node 104a then transmits the D-node commands 610a-e to the D-node 106a for further processing. In addition, the C-node 104a transmits the D-node commands 610f-j to the D-node 106b for further processing. Furthermore, at step 804, the C-node 104b receives the C-node command 410b, and decomposes the C-node command 410d into the plurality of D-node commands 710a-j. The C-node 104b then transmits the D-node commands 710a-e to the D-node 106c for further processing. In addition, the C-node 104b transmits the D-node commands 710f-j to the D-node 106d for further processing.

At step 806, the D-node 106a receives the plurality of D-node commands 610a-e and executes each of the D-nude commands 610a-e. Furthermore, at step 806, the D-node 106b receives the plurality of D-node commands 610f-j and executes each of the D-node commands 610f-j. Furthermore, at step 806, the D-node 106c receives the plurality of D-node commands 710a-e and executes each of the D-node commands 710a-e. Furthermore, at step 806, the D-node 106d receives the plurality of D-node commands 710f-j and executes each of the D-node commands 710f-j.

Although in the present example the I/O request 200 is a write request, it will be understood that any suitable type of I/O request can be processed in the manner described with respect to the process 800. For example, in instances in which the storage system 100 receives a read request, this request may also be decomposed into D-node commands which are then executed to retrieve different pages of data stored in the volumes 160. The retrieved pages of data may then be combined into a single frame, and this frame may be returned to the source of the read request.

Figure 8C:
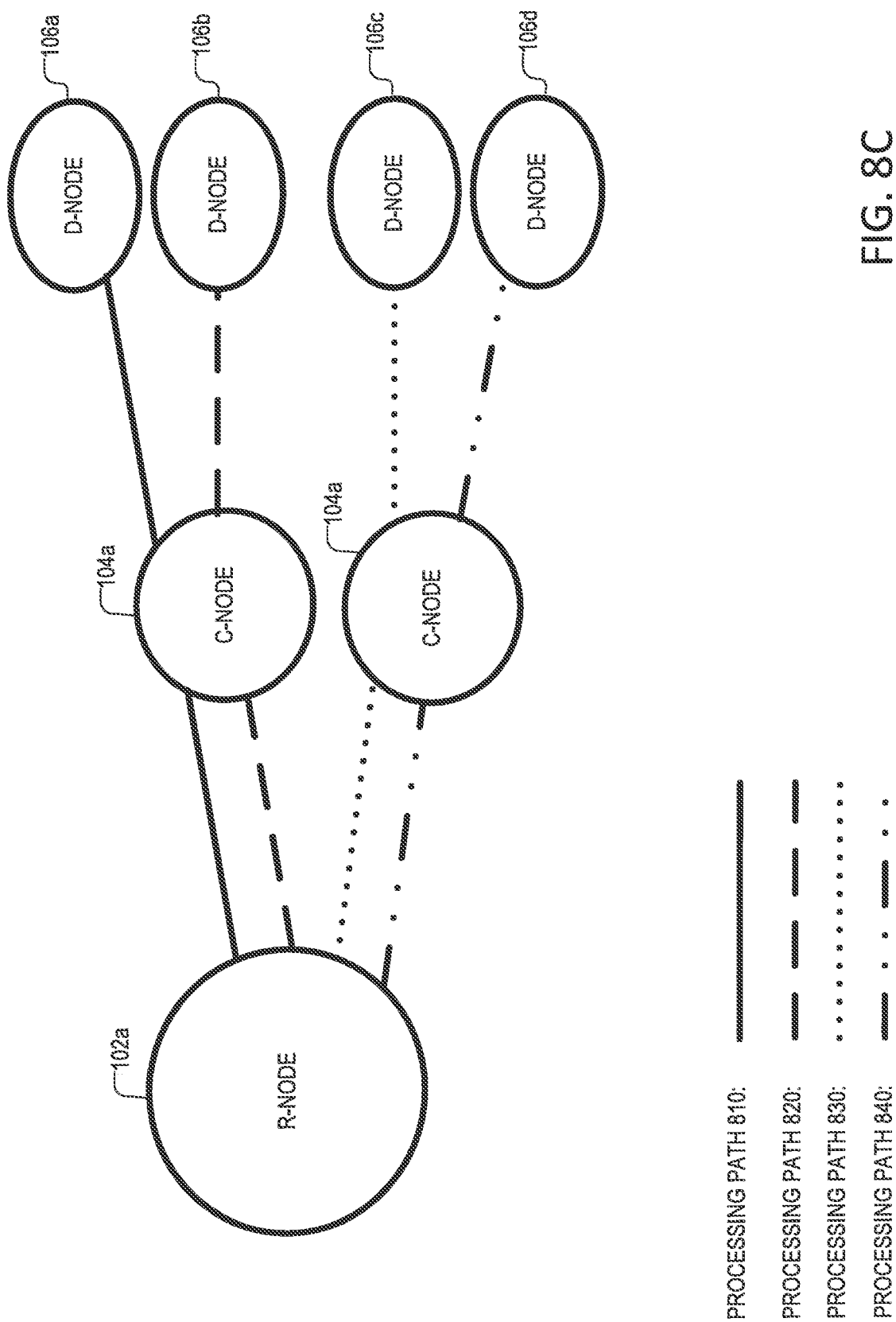
FIG. 8C is a diagram illustrating an example of a plurality of processing paths that are used to execute the I/O request of FIG. 2, according to aspects of the disclosure.

As illustrated by FIG. 8C, in the present example, the I/O request 200 is executed using processing paths 810, 820, 830, and 840. A processing path, according to the present disclosure, may be the set of nodes in the storage system 100 that are used to process one or more internal node commands (e.g., C-node commands and D-node commands) that are generated within the storage system 100. By way of example, in some implementations, any processing path in the storage system 100 may include only one node from each tier in the storage system 100, More specifically, in some implementations, any processing path in the storage system 100 may include only one R-node, only one C-node, and only one D-node. Additionally or alternatively, in some implementations, any processing path in the storage system 100 may include only one C-node and only one D-node. In this regard, in the example of FIGS. 8A-B, the processing path 810 includes the nodes 102a, 104a, and 106a; the processing path 820 includes the nodes 102a, 104a, and 106b; the processing path 830 includes the nodes 102a, 104b, and 106c; and the processing path 840 includes the nodes 102a, 104b, and 106d.

In some aspects, the use of multiple entry points (such as the it-nodes 102) and redundant processing paths (such as the processing paths 810-840) may increase the speed at which incoming I/O requests are serviced by the storage system 100. On the other hand, however, the availability of multiple entry points into the storage system 100, the presence of redundant processing paths, makes the system susceptible to becoming unbalanced when one of the nodes in the storage system 100 is overloaded. Furthermore, differences in the hardware used to implement different nodes in the storage system 100 and/or incorrect tuning of any of the tables 120 and 150 may also cause the storage system 100 to become unbalanced when one of the nodes in the storage system 100 is overloaded. When the system is in an unbalanced state, and any of the nodes in the storage system 100 is overloaded, the storage system 100 may experience various types of node instability and crashes. For example, the system may exhibit increased operational latency, and even a failure to meet guaranteed threshold latency, which in turn could result in client timeouts. Moreover, when the storage system 100 is overloaded (e.g., processing too many concurrent I/O requests, or processing I/O request(s) that are too large), cluster instability, crashes, and degraded operation of storage system 100 may result.

According to aspects of the disclosure, a technique for flow control is provided which may reduce the likelihood of the storage system 100 becoming overloaded and/or failing to meet its operational constraints. In some implementations, the technique for flow control may be executed concurrently with the execution of the I/O request 200 by the storage system 100. In accordance with the technique, the R-node 102a may deter urine a path-specific latency metric of each of the processing paths 810-840, identify the largest one among the determined latency metrics, and reconfigure the size of the R-node's 102a respective bandwidth limiter 130a based on the magnitude of largest path-specific latency metric. For example, if the largest path-specific metric is greater than a first threshold, the R-node 102a may decrease its respective window size 140a. On the other hand, if the largest path-specific metric is less than a second threshold (the second threshold being smaller than the first threshold), the R-node 102a may increase its respective window size 140a.

The path-specific latency metric for any of the processing paths 810-840 may be based on latency metrics that are generated by one or more of the nodes 104 and 106 in that path and reported to the R-node 102. In some implementations, the path-specific latency metric for one of the processing paths 810-840 may be based on one or more D-node latency metrics that are generated by the D-node 106 in that path. For example, the path specific latency metric for the processing path 810a may be determined based on at least one of a C-node latency metric that is provided by the C-node 104a and a D-node latency metric that is provided by the D-node 106a; the path specific latency metric for the processing path 820 may be determined based on at least one of a C-node latency metric that is provided by the C-node 104a and a D-node latency metric that is provided by the D-node 106b; the path specific latency metric for the processing path 830 may be determined based on at least one of a C-node latency metric that is provided by the C-node 104b and a D-node latency metric that is provided by the D-node 106c; and the path specific latency metric for the processing path 840 may be determined based on at least one of a C-node latency metric that is provided by the C-node 104b and a D-node latency metric that is provided by the D-node 106d;

According to aspects of the disclosure, a technique is disclosed for reconfiguring D-nodes in the storage system 100 when the D-nodes become overloaded. in some implementations, the technique may be executed concurrently with the execution of the I/O request 200 by the storage system 100. In accordance with the technique, the R-node 102a may determine a node-specific latency metric for a given one of the D-nodes 106 that are used to execute the I/O request 200 (Le., the nodes 106a-d). Afterwards, the R-node 102a may determine if the node-specific latency metric is greater than a threshold. If the node-specific latency metric is greater than the threshold, the R-node 102a may reduce the logical space that is managed by the given D-node 106. Reducing the logical space may include updating each of the tables 150 to specify a new range of hash addresses that is associated with the given D-node, the new range being narrower than the previous range. Furthermore, as can be readily appreciated, when the logical space of the given D-node is reduced, the logical space of another D-node may be increased to compensate for the reduction. Increasing the logical space may include updating each of the tables 150 to specify a new range of hash addresses that is associated with the other D-node, the new range being wider than the previous range. in some implementations, the R-node 102 may update the tables 150 by transmitting to each of the C-nodes 104 a message, which when received by any of the C-nodes causes the C-node to modify its respective table 150 to include a new hash-range that is specified in the message. In some implementations, the node-specific latency metric for a given D-node may be based on the average of all D-node latency metrics that are provided by the given node during a predetermined period, Additionally or alternatively, in some implementations, the node-specific latency metric for a given D-node may be based on the largest D-node latency metric reported by the given D-node during a predetermined.

According to aspects of the disclosure, a technique is disclosed for reconfiguring C-nodes in the storage system 100 when the C-nodes become overloaded. In some implementations, the technique may be executed concurrently with the execution of the I/O request 200 by the storage system 100. In accordance with the technique, the R-node 102a may determine a node-specific latency metric for a given one of the C-nodes 104 that is used to execute the I/O request 200 (i.e., the nodes 104a-b). Afterwards, the R-node 102a may determine if the node-specific latency metric is greater than a threshold. If the node-specific latency metric is greater than the threshold, the R-node 102a may reduce the logical space that is managed by the given C-node 104. Reducing the logical space may include, updating the table 120a to specify a new range of LDAs that is associated with the given C-node, the new range being narrower than the previous range. Furthermore, as can be readily appreciated, when the logical space of the given C-node is reduced, the logical space of another C-node may be increased in the table 120a to compensate for the reduction. Increasing the logical space may include, updating the table 120a to specify a new range of hash addresses that is associated with the other C-node, the new range being wider than the previous range. Furthermore, in addition to modifying the table 120a, the R-node 102a may also modify the instances of the table 120 that are used by the other FI.-nodes 102 in the storage system 100. For example, the R-node 102a may transmit the modified version of the table 120a to all remaining R-nodes 102 nodes in the storage system 100, along with an instruction for the remaining R-nodes 102 to replace their respective tables 120 with the modified version of the table 120a, Upon receiving the modified version of the table 120a, each of the remaining nodes may replace the version of table 120 it is currently using with the modified version of the table 120a. In this way, any change that is made to the table 120a of the node 102a is propagated across all other instances of the table 120 that are used by the remaining R-nodes 102 in the storage system 120.

Figure 9:
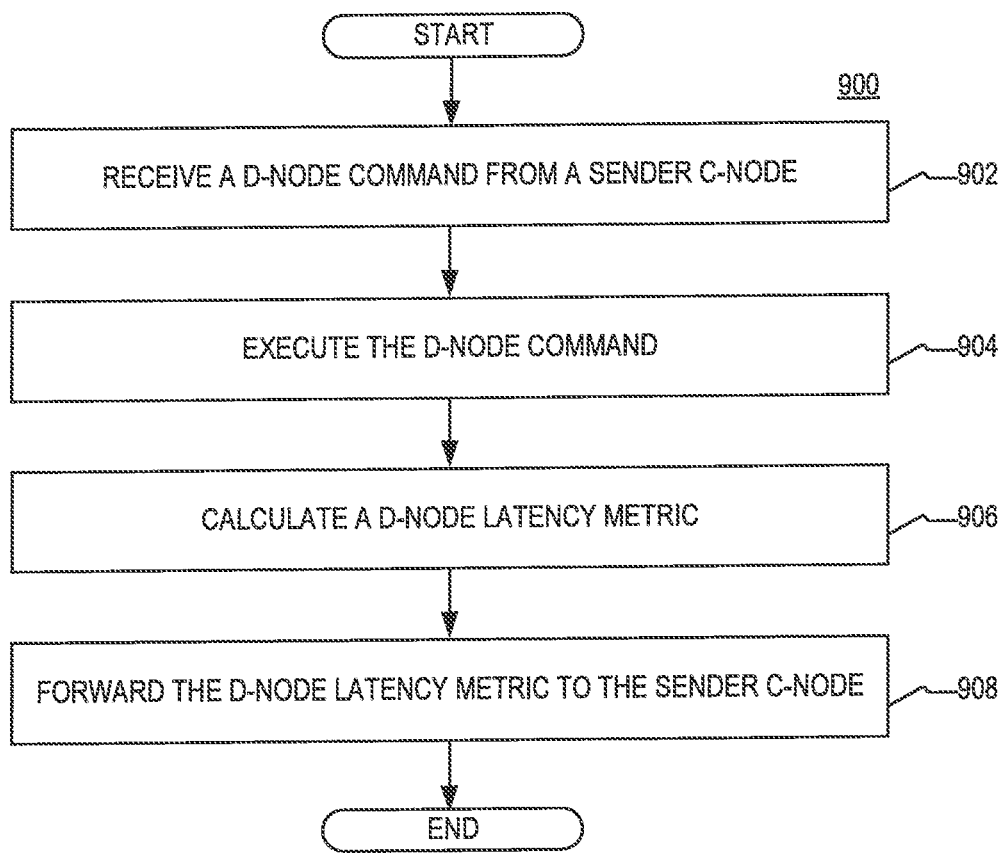
FIG. 9 is a flowchart of an example of a process performed by any of the D-nodes in the system of FIG. 1, according to aspects of the disclosure.
Figure 10:
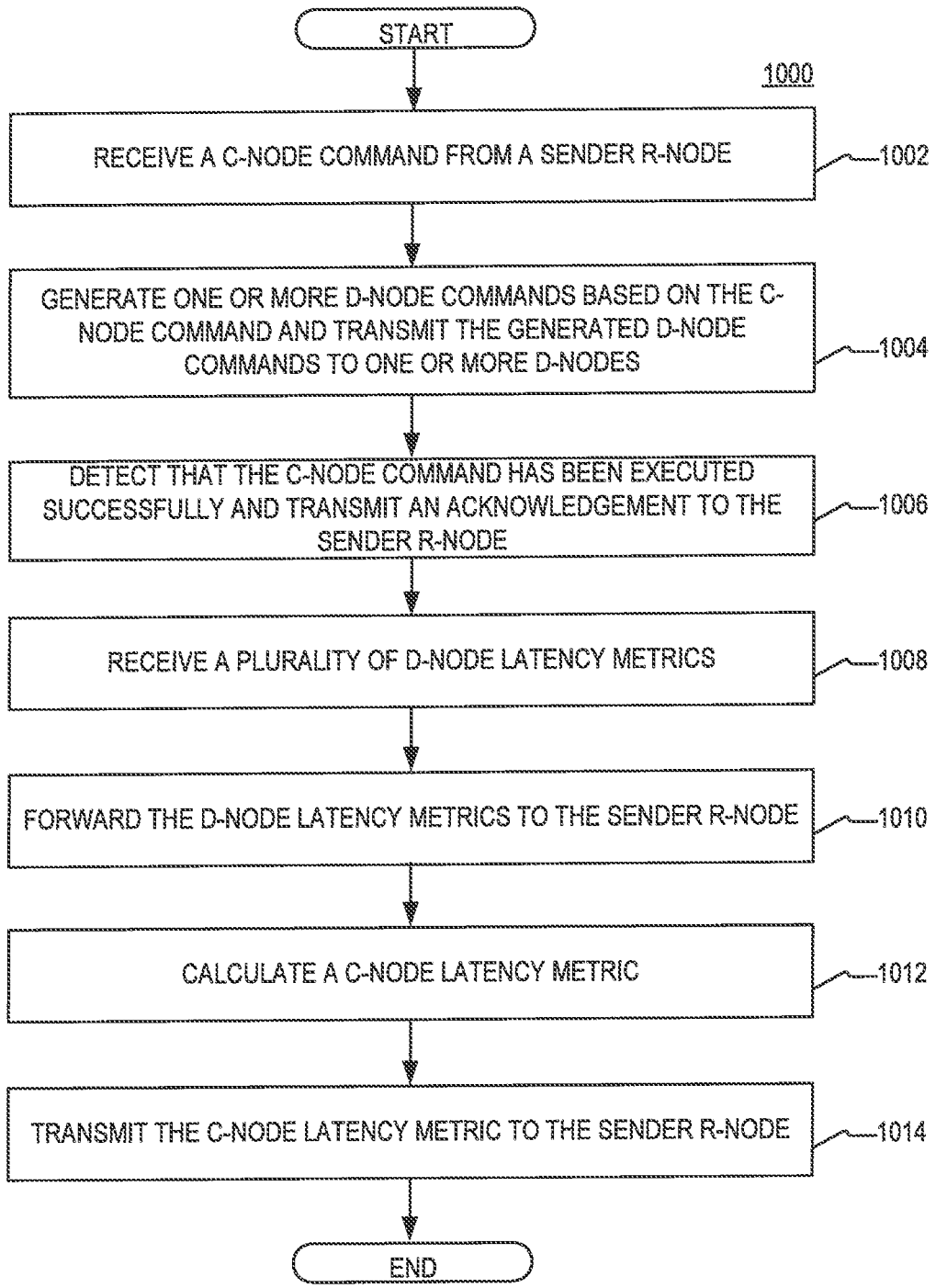
FIG. 10 is a flowchart of an example of a process performed by any of the C-nodes in the system of FIG. 1, according to aspects of the disclosure.
Figure 11:
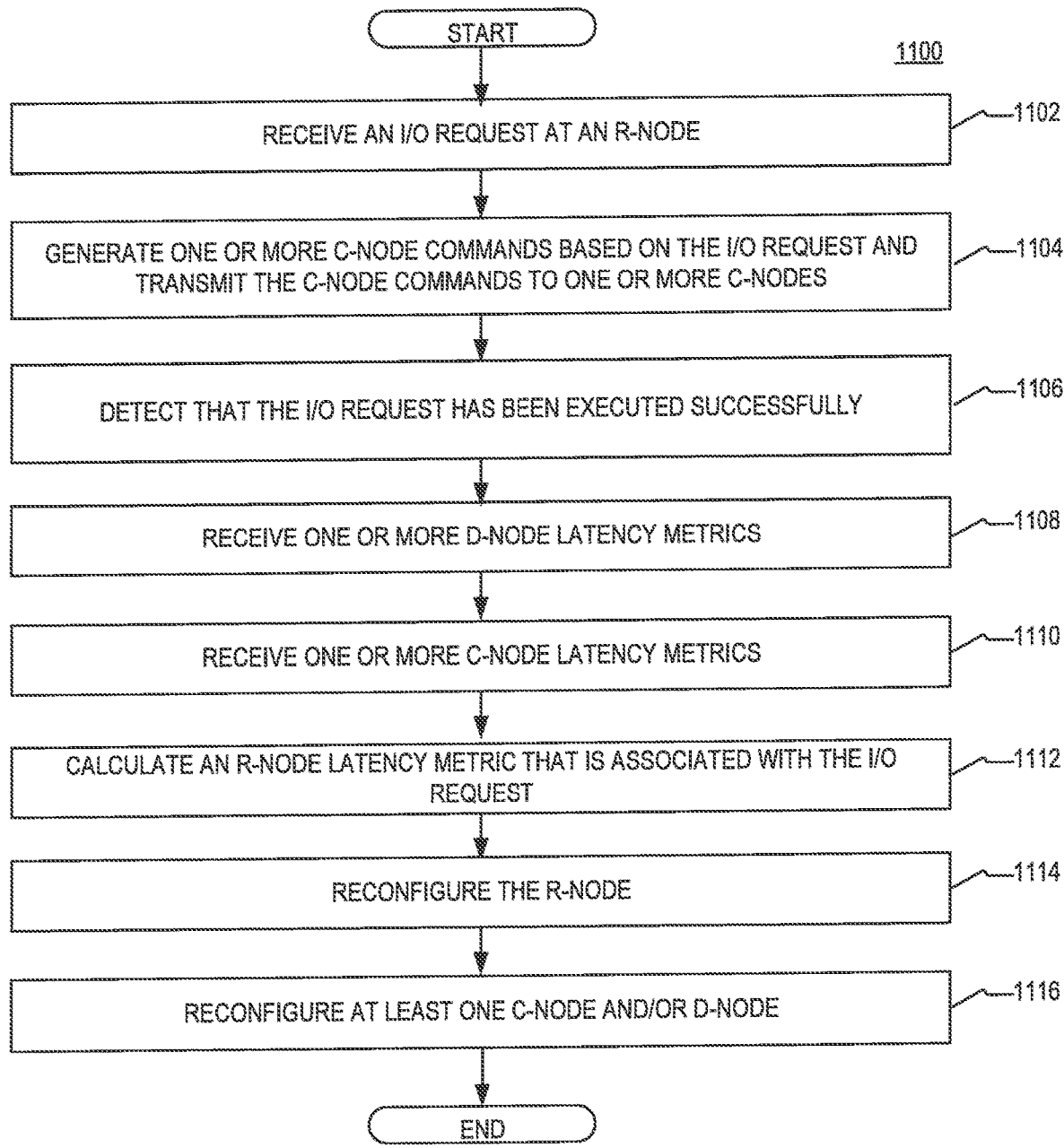
FIG. 11 is a flowchart of an example of a process performed by any of the R-nodes in the system of FIG. 1, according to aspects of the disclosure.

FIGS. 9, 10, and 11 provide examples of processes for implementing the above-described techniques for flow control and logical space reconfiguration. The processes provided by FIGS. 9, 10, and 11 are each executed at a different tier of the storage system 100. For example, the process provided by FIG. 9 can be executed by any of the D-nodes 106; the process provided by FIG. 10 can be executed by any of the D-nodes 106; and the process provided by FIG, 11 can be executed by any of the R-nodes 102. The processes provided by FIGS. 9, 10, and 11 are now described in further detail.

FIG. 9 is a flowchart of an example of a process 900 for executing D-node commands at a D-node in a storage system, according to aspects of the disclosure. At step 902, a D-node receives a D-node command from a source C-node. The D-node command may include a data payload, a hash associated with the payload, and an opcode specifying an operation that is required to be performed on the data payload. At step 904, the D-node executes the D-node command. Executing the D-node command may include translating the hash digest contained in the D-node command to a physical address in a volume that is attached to the D-node and transmitting to the volume an instruction that is based on the physical address and the opcode. Upon receiving the instruction, the volume may execute the instruction and provide the D-node with an acknowledgement indicating that the instruction has been executed. Upon receiving the acknowledgment, the D-node may transmit to the source C-node, another acknowledgment indicating that the D-node command has been executed. At step 906, the D-node determines a D-node latency metric. At step 908, the D-node transmits the D-node latency metric to the source C-node. Although in the present example the D-node latency metric is transmitted in a separate message, in some implementations, the D-node latency metric may be transmitted as a (minor) payload into regular (I/O-related) interchange. For example, in some implementations, the D-node latency metric may be transmitted with the acknowledgment that the source C-node.

In some implementations, the D-node latency metric may be any suitable metric that indicates (at least partially) the time taken by the D-node to execute the D-node command received at step 902. Additionally or alternatively, in some implementations, the D-node latency metric may be any suitable type of metric that indicates (at least partially) the time it takes the D-node to service incoming D-node commands under a current load of the storage system. In the latter case, the D-node latency metric may be calculated periodically by the D-node, and it may or may not be specifically-associated with a given D-node command. In the present example, the latency metric is the duration of the period starting when the D-node command is received at the D-node and ending when the instruction for the volume is provided to the volume for further processing. However, alternative implementations are possible in which the D-node latency metric may be the duration of the period starting when the D-node command is received at the D-node and an ending when the acknowledgment is received from the volume. The present disclosure is not limited to any specific way of calculating the D-node latency metric.

FIG. 10 is a flowchart of an example of a process 1000 for executing C-node commands at a C-node in a storage system, according to aspects of the disclosure. At step 1002, the C-node receives a C-node command from a source R-node. At step 1004, the C-node decomposes the C-node command into a plurality of D-node commands and transmits each of the generated D-node commands to respective D-nodes for further execution. At step 1006, the C-node detects that the C-node command has been executed successfully and transmit an acknowledgment indicating the successful execution of the C-node command to the source R-node. In some implementations, the C-node may detect that the C-node command has been executed successfully in response to receiving a respective acknowledgment for each of the D-node commands that confirms that the D-node command has been executed successfully. At step 1008, the D-node receives a plurality of D-node latency metrics. Each D-node latency metric may be received from one of the D-nodes to which the D-node commands are transmitted. As discussed above, each D-node latency metric may (partially) indicate at least one of (i) the time it took the sender D-node to execute one of the D-node commands generated at step 1004, and (ii) the time it takes the D-node to service incoming D-node commands in general, under the current load of the storage system. In some implementations, each D-node latency metric may be associated with a different one of the D-node commands. At step 1010, the D-node forwards the received D-node latency metrics to the source R-node. At step 1012, the C-node calculates a C-node latency metric corresponding to the C-node command, At step 1014, the C-node transmits the C-node latency metric to the source R-node.

In some implementations, the C-node latency metric may be any suitable metric that indicates (at least partially) the time taken by the C-node to execute the C-node command received at step 1002. Additionally or alternatively, in some implementations, the D-node latency metric may be any suitable type of metric that indicates (at least partially) the time it takes the C-node to service incoming C-node commands under a current load of the storage system. In the latter case, the C-node latency metric may be calculated periodically by the C-node, and it may or may not be specifically-associated with a given C-node command. In the present example, the C-node latency metric is the duration of the period starting when the C-node command is received and ending when the last one of the D-node commands is transmitted through the respective recipient D-node. However, alternative implementations are possible in which the C-node latency metric is the duration of the period starting when the C-node command is received at the C-node and ending when the last one of the plurality of acknowledgments is received by the C-node. The present disclosure is not limited to any specific way of calculating the C-node latency metric.

FIG. 10 is provided as an example only. At least some of the steps in the process 1000 can be performed concurrently, in a different order, or altogether omitted. For example, although in the present example, steps 1006, 1010, and 1014 are depicted as separate blocks, in some implementations, steps 1006, 1010, and 1014. In such implementations, the D-node latency metrics, and the C-node latency metric may be packaged in the acknowledgment that is transmitted to indicate the successful execution of the C-node command. In this regard, it will be understood that the D-node latency metrics and/or C-node latency metrics may be included periodically in regular replies that are transmitted from the C-node to the D-node.

FIG. 11 is a flowchart of an example of a process 1100 for executing I/O requests at an R-node in a storage system, according to aspects of the disclosure. At step 1102 an I/O request is received at the R-node. At step 1104, the R-node decomposes the I/O request into a plurality of C-node commands, and the C-node commands are transmitted to recipient C-nodes for further execution. At step 1106, the R-node receives a plurality of acknowledgements indicating that each of the C-node commands has been successfully executed and detects that the I/O request has been executed successfully. At step 1108, the R-node receives a plurality of D-node latency metrics. As discussed above, each D-node latency metric may (partially) indicate at least one of: (i) the time it took the sender D-node to execute a given D-node command that is generated by decomposing one of the C-nodes commands generated at step 1104, and (ii) the time it takes the sender D-node to service incoming D-node commands in general, under the current load of the storage system. At step 1110, the R-node receives a plurality of C-node latency metrics corresponding to the C-node commands transmitted at step 1104. As discussed above, each C-node latency metric may (partially) indicate at least one of: (i) the time it took the sender C-node to execute a one of the C-nodes commands generated at step 1104, and (ii) the time it takes the sender C-node to service incoming C-node commands in general, under the current load of the storage system. Although steps 1108 and 1110 are represented in FIG. 11 as separate blocks, it will be understood that in some implementations, the D-node latency metrics and/or the C-node latency metrics may be received in the same message (and/or frame). Stated succinctly, the present disclosure is not limited to any specific way of receiving C-node latency metrics and/or D-node latency metrics at the R-node.

At step 1112, the R-node calculates an R-node latency metric associated with the execution of the I/O request. In some implementations, the R-node latency metric may be any suitable metric that indicates (at least partially) the time taken by the R-node to execute the I/O request received at step 1102. Additionally or alternatively, in some implementations, the R-node latency metric may be any suitable type of metric that indicates (at least partially) the time it takes the C-node to service incoming R-node commands under a current load of the storage system. In the latter case, the R-node latency metric may be calculated periodically by the C-node, and it may or may not be specifically-associated with a given I/O request. In the present example, the C-node latency metric is the duration of the period starting when the I/O request is received command is received and ending when the last one of the C-node commands is transmitted through the respective recipient D-node. However, alternative implementations are possible in which the C-node latency metric is the duration of the period starting when the C-node command is received at the C-node and ending when the last one of the plurality of acknowledgements is received by the R-node. The present disclosure is not limited to any specific way of calculating the R-node latency metric At step 1114, the R-node changes the window size of its respective bandwidth limiter based on one or more of the latency metrics received/calculated at the R-node. In some implementations, the R-node may increase or decrease the window size based on one or more of the received D-node latency metrics. Additionally or alternatively, in some implementations, the R-node may increase or decrease the window size based on one or more of the received C-node latency metrics. Additionally or alternatively, in some implementations, the R-node may increase or decrease the window size based on the R-node latency metric. In some implementations, step 1116 may be performed in accordance with a process 1200, which is discussed further below with respect to FIG. 12.

At step 1116, the R-node detects whether any of the D-nodes or C-nodes in the system is overloaded and adjusts the size of the logical space managed by the node when the node is overloaded. In some implementations, step 1116 may be performed in accordance with a process 1300, which is discussed further below with respect to FIG. 13.

Figure 12:
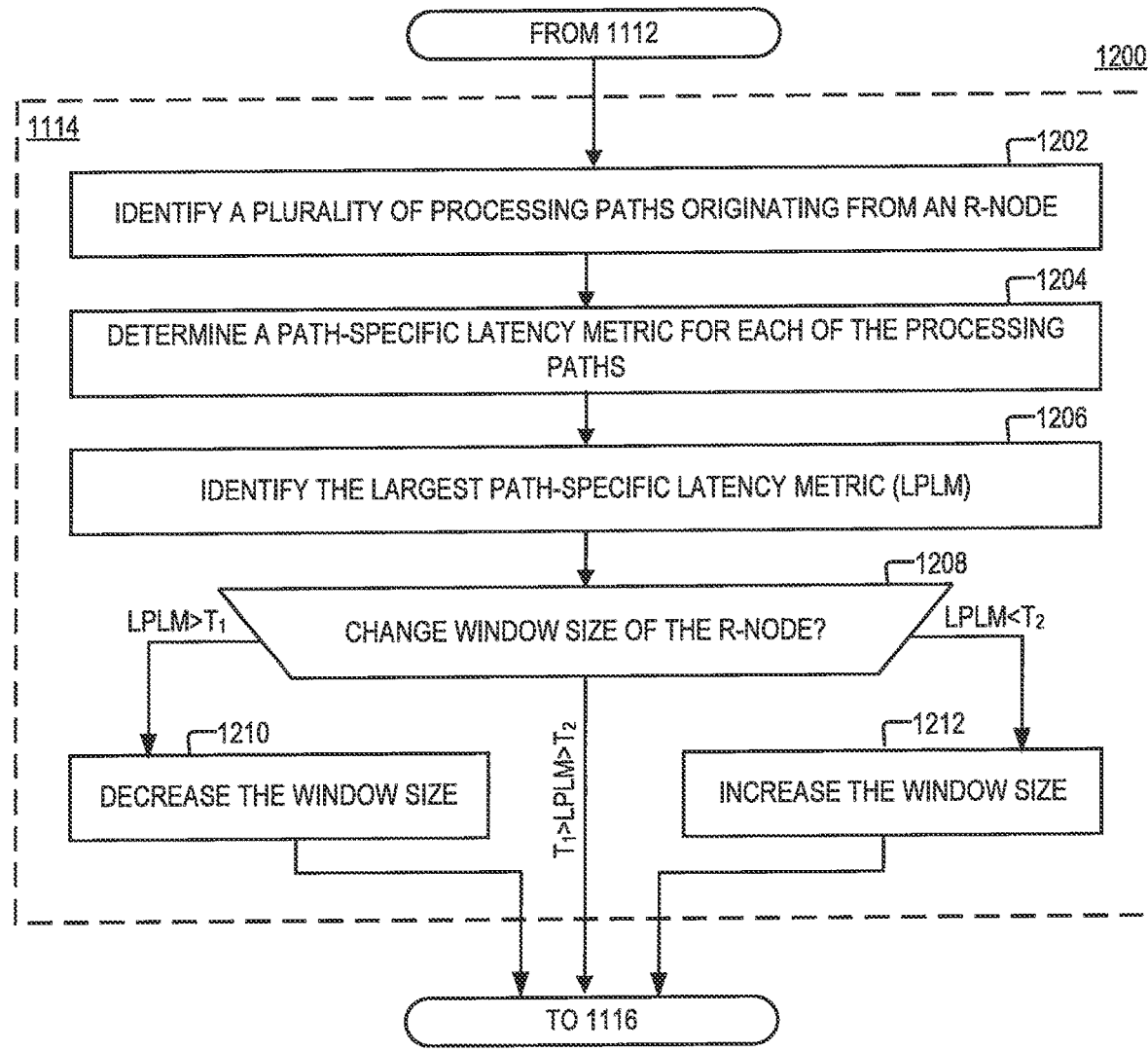
FIG. 12 is a flowchart of an example of a sub-process associated with the process of FIG. 11, according to aspects of the disclosure.

FIG. 12 is a diagram of an example of a process for reconfiguring an R-node, as specified by step 1114 of the process 1100. At step 1202, the R-node identifies a plurality of processing paths in the storage system. In some implementations, the identified processing paths may include only processing paths that are used to execute the I/0 request received at step 1102. Additionally or alternatively, in some implementations, the identified processing paths may include any suitable processing path that starts at the R-node and ends at one of the D-nodes in one of the storage systems. At step 1204, the R-node may determine a respective path-specific latency metric for each of the identified processing paths. At step 1206, R-node identifies the largest one of the determined path-specific latency metrics. At step 1208, the R-node determines whether the largest latency metric is greater than a first threshold. In addition, at step 1208, the R-node determines whether the largest latency metric is smaller than a second threshold, wherein the second threshold has a lower value than the first threshold. If the largest path-specific latency metric is greater than the first threshold, the process 1200 proceeds to step 1210 where the R-node decreases the window size of its respective bandwidth limiter. If the largest path-specific latency metric is smaller than the second threshold, the process 1200 proceeds to step 1212 where the R-node increases the window size of its respective bandwidth limiter. If the largest path-specific latency metric is neither larger than the first threshold nor smaller than the second threshold, the window size of the R-node is left unchanged.

In some implementations, the path-specific latency metric for a given processing path may be any suitable metric that at least in part indicates the time taken by the nodes in the given path to execute a portion of the I/O request received at step 1102. Additionally or alternatively, in some implementations, the path-specific latency metric for a given processing path may be any suitable metric that at least in part indicates the time taken by the nodes in the given path to execute portions of I/O requests that are routed along the path, given the current load of the system. Additionally or alternatively, in some implementations, the path-specific latency metric for a given processing path may be based on the sum of: (i) the largest D-node latency metric provided by a D-node that is part of the path during a predetermined period and (ii) the largest C-node latency metric provided by a C-node that is part of the path during a predetermined period. Additionally or alternatively, in some implementations, the path-specific latency metric for a given processing path may be based on the sum of (i) the average of the D-node latency metrics provided by a D-node that is part of the path during a predetermined period and (ii) the average of the C-node latency metrics provided by a C-node that is part of the path during a predetermined period. Additionally or alternatively, the path-specific latency metric for a given processing path may be based on the R-node latency metric calculated at step 1112. Additionally or alternatively, the path-specific latency metric for a given processing path may be based on any of the C-node latency metrics received at step 1110 that is generated by a C-node in the given processing path, Additionally or alternatively, the path-specific latency metric for a given processing path may be based on any of the D-node latency metrics received at step 1108 that is generated by a D-node in the given processing path. Additionally or alternatively, the path-specific latency metric for a given processing path may he based on the sum of the R-node latency metric calculated at step 1112, one or more of the C-node latency metrics received at step 1110 that are generated by a C-node that is part of the given path, and one or more of the D-node latency metrics received at step 1108 that are generated by D-node that is part of the given path. The present disclosure is not limited to any specific method for calculating the path-specific metric for any of the processing paths.

Figure 13:
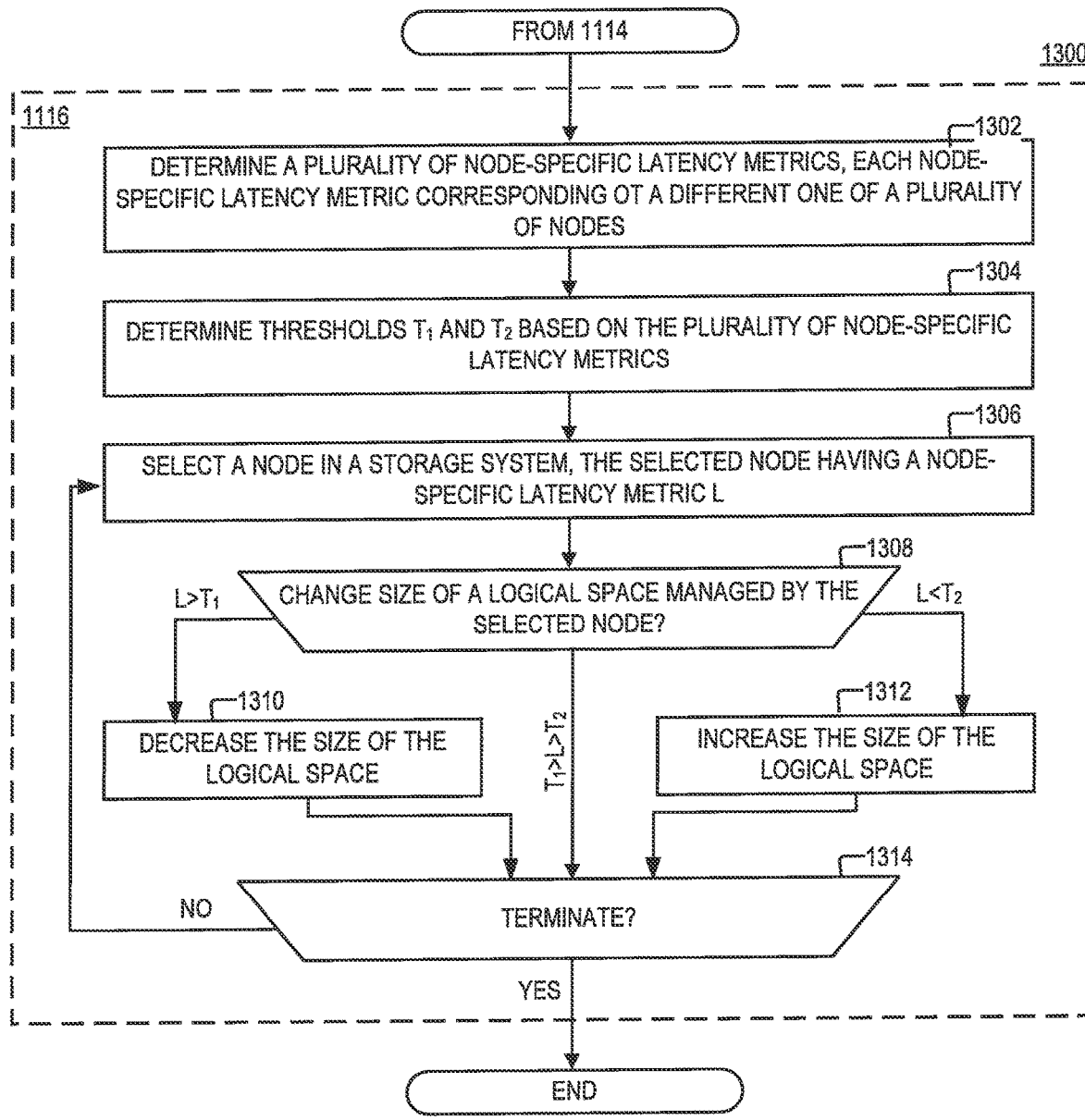
FIG. 13 is a flowchart of an example of another sub-process associated with the process of FIG. 11, according to aspects of the disclosure.

FIG. 13 is a diagram of an example of a process for reconfiguring at least one C-node and/or D-node, as specified by step 1116 of the process 1100.

At step 1302, a plurality of node-specific latency metrics is determined, such that each node-specific latency metric in the plurality corresponds to a different one of a plurality of nodes. In some implementations, the plurality of nodes may include only nodes from the same tier of the storage system (e.g., only D-nodes or only C-nodes). Additionally or alternatively, in some implementations, the plurality of node-specific latency metrics may include nodes from different tiers (e.g., both C-nodes and D-nodes). Additionally or alternatively, in some implementations, the plurality of nodes may include all D-nodes in the storage system and/or all C-nodes in the storage system.

At step 1304, a first threshold and a second threshold are determined based on the plurality of node-specific latency metrics. In some implementations, any of the first threshold and the second threshold may be calculated based on the average of the plurality of node-specific latency metrics. Additionally or alternatively, in some implementations, any of the first threshold and the second threshold may be determined based on a median of the plurality of node-specific latency metrics. In such instances, the first threshold may have a value that is M standard deviations greater than the median; and the second threshold may have a value that is N standard deviations grater than the median, wherein M and N are both integers greater than or equal to one, and the standard deviation is calculated over the plurality of node-specific latency metrics. As can be readily appreciated, according to the present example, the second threshold has a lower value than the first threshold.

At step 1306, one of the plurality of nodes in the storage system is selected, According to the present example, the selected node has a node-specific latency metric L. At step 1308, a determination is made if the node-specific latency metric L of the selected node is greater than the first threshold. In addition, at step 1306, a determination is made if the node-specific latency metric L of the selected node is smaller than the second threshold, the second threshold having a lower value. If the node-specific latency metric L of the selected node is larger than the first threshold, the process 1300 proceeds to step 1310 where the logical space managed by the selected node is reduced. If the node-specific metric L of the selected node is smaller than the second threshold, the process 1300 proceeds to step 1312 where the logical space managed by the selected node is increased. If the node-specific metric is neither larger than the first threshold nor smaller than the second threshold, the logical space of the selected node is left unchanged. At step 1314, a determination is made if there are any remaining nodes that remain to be processed. If there are nodes that remain to be processed, the process returns to step 1306 and steps 1306-1312 are repeated for another one of the plurality of nodes. Otherwise, if there are no more nodes that remain to be processed, the process 1300 ends.

In some implementations, the node-specific latency metric for any one of the plurality of nodes may be determined based on one or more latency metrics that are generated by this node (e.g., D-node latency metrics when the node is a D-node or C-node latency metrics when the node is a C-node). For example, the node-specific latency metric for the node may be the largest latency metric that is generated by the node during a predetermined period or the average of the node-specific latency metrics that are generated by the node during the predetermined period. The present disclosure is not limited to any specific method for calculating the node-specific latency metrics.

In some implementations, the logical space of any selected node may be reduced in the manner discussed above with respect to FIGS. 8A-B. More specifically, the logical space of the selected node may be reduced by modifying one or more tables that specify a range of hash digests or LDAs that are associated with the selected node. The modification may include replacing a previous range of hash digests or LDAs with a new range that is narrower than the previous range. In some implementations, when the logical space of the selected node is reduced the logical space of another node may be increased to compensate for the reduction.

In some implementations, the logical space of any selected node may be increased in the manner discussed above with respect to FIGS. 8A-B. More specifically, the logical space of the selected node may be reduced by modifying one or more tables that specify a range of hash digests or LDAs that are associated with the selected node. The modification may include replacing a previous range of hash digests or LDAs with a new range that is wider than the previous range. In some implementations, when the logical space of the selected node is increased the logical space of another node may be reduced to compensate for the increase.

In some implementations, any change to the logical space of one or more C-nodes in the storage system may be propagated across the entire storage system by the R-node making the change. In such instances, the R-node making the change may modify the instance of the A2C table that is stored locally in the R-node's memory. Afterwards, the R-node may transmit the modified version of the A2C table to all remaining R-nodes in the storage system, along with an instruction for the remaining R-nodes to replace the instances of the A2C table, which are stored (and used) locally in the R-nodes' respective memories, with the modified version of the A2C table. Upon receiving the modified version of the A2C table, each of the remaining R-nodes may replace the instance of the A2C table that is stored in the remaining R-node's memory with the received modified version of the AK table.

in some implementations, any change to the logical space of one or morel-nodes in the storage system may be propagated across the entire storage system by the R-node making the change. In such instances, the R-node making the change may generate an updated H2D table which implements the change(s) to the logical spaces of one or more D-nodes. Afterwards, the R-node may transmit the updated H2D table to all C-nodes in the storage system, along with an instruction for the C-nodes to replace the instances of the H2D table that are stored (and used) locally in the C-nodes respective memories with the modified version of the H2D table. Upon receiving the modified version of the H2D table, each of the C-nodes may replace the instance of the H2D table that is stored in the remaining R-node's memory with the updated H2D table.

Figure 14:
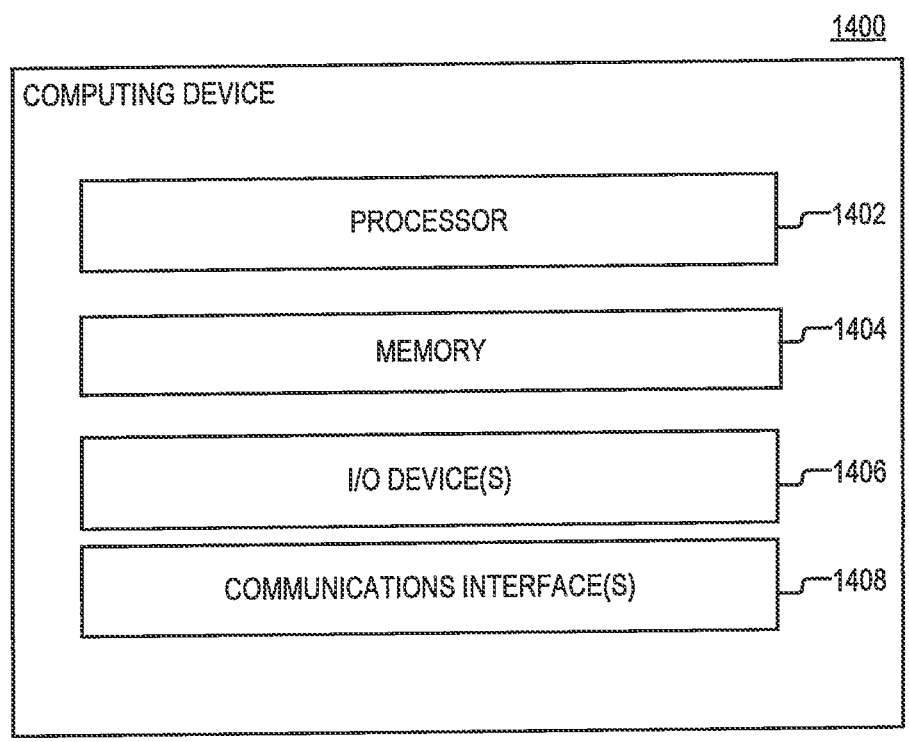
FIG. 14 is a diagram of an example of a computing device that can he used to implement any of the R-nodes, C-nodes, and D-nodes of the system of FIG. 1, according to aspects of the disclosure.

FIG. 14 is a diagram of an example of a computing device 1400, according to aspects of the disclosure. In some implementations, the computing device may be used to implement any of the R-nodes 102 of the storage system 100, any of the C-nodes 104 in the storage system 100, and/or any of the D-nodes 106 in the storage system 100. As illustrated, the computing device 1400 may include one or more processors 1402, a memory 1404, I/O device(s) 1406, and a communications interface 1408 that are operatively coupled to one another. The processor 1402 may include any of one or more general-purpose processors (e.g., x86 processors, RISC processors, ARM-based processors, etc.), one or more Field Programmable Gate Arrays (FPGAs), one or more application specific circuits (ASICs), and/or any other suitable type of processing circuitry. The memory 1404 may include any suitable type of volatile and/or non-volatile memory. In some implementations, the memory 1404 may include one or more of a random-access memory (RAM), a dynamic random memory (DRAM), a flash memory, a hard drive (HD), a solid-state drive (SSD), a network accessible storage (NAS), and or any other suitable type of memory device. The I/O device(s) 1406 may include any suitable type of input and/or output device, such as one or more mice, one or more keyboards, one or more microphones, or one or more display monitors, for example. The communication(s) interfaces 1408 may include any suitable type of communications interface, such as one or more Ethernet adapters, one or more Wi-Fi adapters (e.g., 802.1414 adapters), and one or more Long-Term Evolution (LTE) adapters, for example.

Although FIG. 14 depicts the computing device 1400 as an integrated system, it will be understood that in some implementations, the computing device 1400 may be a distributed system. In such instances, the computing device 1400 may include a plurality of nodes that are connected to one another via a communications fabric (e.g., an InfiniBand network, a Local Area Network, etc.). Each node may include a respective processor, a respective memory, respective I/O device(s), and respective communication(s) terminal. In this regard, it will be understood that the techniques for trace collection that are described in this disclosure are not limited to any particular computing platform.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will he further understood that various changes in the details, materials, and arrangements of the parts which have been described and illustrated in order to explain the nature of the claimed invention might be made by those skilled in the art without departing from the scope of the following claims.

The invention claimed is:

1. A method for processing I/O requests that are received at a distributed storage system including a plurality of receiver nodes, a plurality of first nodes, and a plurality of second nodes, the method comprising:

receiving, at a receiver node, an I/O request and executing the I/O request by decomposing the I/O request into a plurality of first internal commands and providing each of the first internal commands to any of a plurality of first nodes, each of the plurality of first nodes being configured to decompose any received first internal commands into one or more second internal commands and provide, based on a table, each of the second internal commands to one of a plurality of second nodes, the table being arranged to map each of a plurality of logical address spaces to a respective one of the plurality of second nodes that is assigned to manage the logical address space, each of the plurality of logical address spaces including a set of addresses that are managed by the same second node;

receiving, at the receiver node, one or more first latency metrics, each of the first latency metrics being generated by a respective one of the plurality of first nodes and indicating, at least partially, a time taken by the respective one of the plurality of first nodes to execute a respective first internal command that is provided to the respective one of the plurality of first nodes by the receiver node;

receiving, at the receiver node, one or more second latency metrics, each of the second latency metrics being generated by a respective one of the plurality of second nodes and indicating, at least partially, a time taken by the respective one of the plurality of second nodes to execute a respective second internal command that is provided to the respective one of the plurality of second nodes by one of the plurality of first nodes, the respective second internal command being generated by decomposing one of the plurality of first internal commands; and reconfiguring the storage system based on any of the first latency metrics and the second latency metrics, wherein reconfigured the storage system includes changing a size of at least one of the plurality of logical address spaces.

2. The method of claim 1, wherein:

the receiver node is configured to receive the I/O request in accordance with a window size that specifies a maximum number of I/O requests that can be processed concurrently by the receiver node, the I/O request is executed using a plurality of processing paths, each processing path including a different one of the plurality of first nodes and a different one of the plurality of second nodes; and configuring at least some of the storage system based on the first latency metrics and the second latency metrics includes detecting a plurality of path-specific latency metrics, such that each path-specific metric corresponds to a different one of the processing paths, and decreasing the window size of the receiver node based on the plurality of path-specific latency metrics.

3. The method of claim 2, wherein the window size of the receiver node is decreased based on a smallest one of the plurality of path-specific latency metrics being lower than a predetermined threshold.

4. The method of claim 1, wherein:

the receiver node is configured to receive the I/O request in accordance with a window size that specifies a maximum number of I/O requests that can be processed concurrently by the receiver node, the I/O request is executed using a plurality of processing paths, each processing path including a different one of the plurality of first nodes and a different one of the plurality of second nodes; and configuring at least some of the storage system based on the first latency metrics and the second latency metrics includes detecting a plurality of path-specific latency metrics, such that each path-specific metric corresponds to a different one of the processing paths, and decreasing the window size of the receiver node based on the plurality of path-specific latency metrics.

5. The method of claim 4, wherein the window size of the receiver node is decreased based on a smallest one of the plurality of path-specific latency metrics exceeding a predetermined threshold.

6. An apparatus for use in a distributed storage system, comprising:

a memory, and one or more processors operatively coupled to the memory, the one or more processors being configured to perform a method comprising the steps of:

receiving an I/O request and executing the I/O request by decomposing the I/O request into a plurality of first internal commands and providing each of the first internal commands to any of a plurality of first nodes, each of the plurality of first nodes being configured to decompose any received first internal commands into one or more second internal commands and provide, based on a table, each of the second internal commands to one of a plurality of second nodes, the table being arranged to map each to the plurality of logical address spaces to a respective one of the plurality of second nodes that is assigned to manage the logical address space, each of the plurality of logical address spaces including a set of addresses that are managed by the same second node;

receiving one or more first latency metrics, each of the first latency metrics being generated by a respective one of the plurality of first nodes and indicating, at least partially, a time taken by the respective one of the plurality of first nodes to execute a respective first internal command that is provided to the respective one of the plurality of first nodes by the one or more processors;

receiving one or more second latency metrics, each of the second latency metrics being generated by a respective one of the plurality of second nodes and indicating, at least partially, a time taken by the respective one of the plurality of second nodes to execute a respective second internal command that is provided to the respective one of the plurality of second nodes by one of the plurality of first nodes, the respective second internal command being generated by decomposing one of the plurality of first internal commands; and reconfiguring the storage system based on any of the first latency metrics and the second latency metrics, wherein reconfiguring the storage system includes changing a size of at least one of the plurality of logical address spaces.

7. The apparatus of claim 6, wherein:

the one or more processors are configured to receive the I/O request in accordance with a window size that specifies a maximum number of I/O requests that can be queued for further processing by the one or more processors, the I/O request is executed using a plurality of processing paths, each processing path including a different one of the plurality of first nodes and a different one of the plurality of second nodes; and configuring at least some of the storage system based on the first latency metrics and the second latency metrics includes detecting a plurality of path-specific latency metrics, such that each path-specific metric corresponds to a different one of the processing paths, and decreasing the window size based on the plurality of path-specific latency metrics.

8. The apparatus of claim 7, wherein the window size is decreased based on a smallest one of the plurality of path-specific latency metrics being lower than a predetermined threshold.

9. The apparatus of claim 6, wherein:

the one or more processors are configured to receive the I/O request in accordance with a window size that specifies a maximum number of I/O requests that can be processed concurrently by the one or more processors, the I/O request is executed using a plurality of processing paths, each processing path including a different one of the plurality of first nodes and a different one of the plurality of second nodes; and configuring at least some of the storage system based on the first latency metrics and the second latency metrics includes detecting a plurality of path-specific latency metrics, such that each path-specific metric corresponds to a different one of the processing paths, and decreasing the window size based on the plurality of path-specific latency metrics.

10. The apparatus of claim 9, wherein the window size is decreased based on a smallest one of the plurality of path-specific latency metrics exceeding a predetermined threshold.

11. A non-transitory computer-readable medium configured to store one or more processor-executable instructions, which when executed by at least one processor causes the at least one processor to perform a method comprising the steps of:

receiving, at a receiver node in a distributed storage system, an I/O request and executing the I/O request by decomposing the I/O request into a plurality of first internal commands and providing each of the first internal commands to any of a plurality of first nodes, each of the plurality of first nodes being configured to decompose any received first internal commands into one or more second internal commands and provide, based on a table, each of the second internal commands to one of a plurality of second nodes, the table being arranged to map each of plurality of logical address spaces to a respective one of the plurality of second nodes that is assigned to manage the logical address space, each of the plurality of logical address spaces including a set of addresses that are managed by the same second node;

receiving, at the receiver node, one or more first latency metrics, each of the first latency metrics being generated by a respective one of the plurality of first nodes and indicating, at least partially, a time taken by the respective one of the plurality of first nodes to execute a respective first internal command that is provided to the respective one of the plurality of first nodes by the receiver node;

receiving, at the receiver node, one or more second latency metrics, each of the second latency metrics being generated by a respective one of the plurality of second nodes and indicating, at least partially, a time taken by the respective one of the plurality of second nodes to execute a respective second internal command that is provided to the respective one of the plurality of second nodes by one of the plurality of first nodes, the respective second internal command being generated by decomposing one of the plurality of first internal commands; and reconfiguring the storage system based on any of the first latency metrics and the second latency metrics, wherein reconfiguring the storage system includes changing a size of at least one of the plurality of logical address spaces.

12. The non-transitory computer-readable medium of claim 11, wherein:

the receiver node is configured to receive the I/O request in accordance with a window size that specifies a maximum number of I/O requests that can be processed concurrently by the receiver node, the I/O request is executed using a plurality of processing paths, each processing path including a different one of the plurality of first nodes and a different one of the plurality of second nodes; and configuring at least some of the storage system based on the first latency metrics and the second latency metrics includes detecting a plurality of path-specific latency metrics, such that each path-specific metric corresponds to a different one of the processing paths, and decreasing the window size of the receiver node based on the plurality of path-specific latency metrics.

13. The non-transitory computer-readable medium of claim 12, wherein the window size of the receiver node is decreased based on a smallest one of the plurality of path-specific latency metrics being lower than a predetermined threshold.

14. The non-transitory computer-readable medium of claim 11, wherein:

the receiver node is configured to receive the I/O request in accordance with a window size that specifies a maximum number of I/O requests that can be processed concurrently by the receiver node, the I/O request is executed using a plurality of processing paths, each processing path including a different one of the plurality of first nodes and a different one of the plurality of second nodes; and configuring at least some of the storage system based on the first latency metrics and the second latency metrics includes detecting a plurality of path-specific latency metrics, such that each path-specific metric corresponds to a different one of the processing paths, and decreasing the window size of the receiver node based on the plurality of path-specific latency metrics.

15. The non-transitory computer-readable medium of claim 14, wherein the window size of the receiver node is decreased based on a smallest one of the plurality of path-specific latency metrics exceeding a predetermined threshold.

* * * * *